United States Patent
Silverman et al.

(10) Patent No.: US 8,346,709 B2
(45) Date of Patent: Jan. 1, 2013

(54) DETERMINING CONVERSION PROBABILITY USING SESSION METRICS

(75) Inventors: Andrew E. Silverman, San Francisco, CA (US); Abhinay Sharma, Mountain View, CA (US); Scott S. Benson, Sunnyvale, CA (US); Adrian Dumitru Corduneanu, Cambridge (CA); Angshuman Guha, Los Gatos, CA (US); Tomas Lloret Llinares, Mountain View, CA (US)

(73) Assignee: Google Inc., Mountain View, CA (US)

( * ) Notice: Subject to any disclaimer, the term of this patent is extended or adjusted under 35 U.S.C. 154(b) by 693 days.

(21) Appl. No.: 12/535,375

(22) Filed: Aug. 4, 2009

(65) Prior Publication Data

US 2010/0198772 A1    Aug. 5, 2010

Related U.S. Application Data

(60) Provisional application No. 61/150,202, filed on Feb. 5, 2009.

(51) Int. Cl.
*G06N 7/06*    (2006.01)

(52) U.S. Cl. ........................................ 706/52; 705/14.49

(58) Field of Classification Search ................... 706/52; 705/14.49
See application file for complete search history.

(56) References Cited

U.S. PATENT DOCUMENTS

2007/0011078 A1    1/2007    Jain et al.
2008/0275753 A1    11/2008    Protheroe et al.

FOREIGN PATENT DOCUMENTS

KR    10-2007-0109590    11/2007
KR    10-2009-0000815    1/2009

OTHER PUBLICATIONS

Ghose et al ("An Empirical Analysis of Sponsored Search performance in Search Engine Advertising" Feb. 2008).*
Hoffman et al ("Advertising Pricing Models for the World Wide Web" 2000).*
Blumrosen et al ("Position Auctions and Non-uniform Conversion Rates" 2008).*
Lakshminarayan et al ("A Novel Two-Stage Clustering Approach for Visitor Segmentation and Prediction Based on Click Stream Attributes" 2001).*
International Search Report and Written Opinion mailed Aug. 18, 2011 from related PCT International Application No. PCT/US2010/022995, 6 pages.
International Search Report and Written Opinion mailed Sep. 16, 2010 from related PCT International Application No. PCT/US2010/022995, 9 pages.

* cited by examiner

*Primary Examiner* — Lut Wong
(74) *Attorney, Agent, or Firm* — Klintworth & Rozenblat IP LLC (57) ABSTRACT

Methods, systems, and apparatus, including computer program products, for determining a probability that a traffic conversion of a content item associated with a content source (e.g., website) will occur based on past traffic patterns for that content source. A traffic conversion defines, for example, minimum traffic interactions of one or more associated user sessions with a content source. The minimum traffic interactions can be based on, for example, the duration of the one or more user sessions on the content source, or a quantity of pages associated with the content source navigated in the one or more associated user sessions.

15 Claims, 6 Drawing Sheets

DETERMINING CONVERSION PROBABILITY USING SESSION METRICS

CROSS-REFERENCE TO RELATED APPLICATION

This application claims the benefit under 35 U.S.C. §119(e) of U.S. Provisional Patent Application No. 61/150,202, entitled "Determining Conversion Probability Using Session Metrics," filed Feb. 5, 2009, which is incorporated here by reference.

BACKGROUND

This specification relates to advertising.

The Internet provides access to a wide variety of content items, e.g., video and/or audio files, web pages for particular subjects, news articles, etc. Such access to these content items has likewise enabled opportunities for targeted advertising. For example, content items of particular interest to a user can be identified by a search engine in response to a user query. The query can include one or more search terms, and these terms can indicate the user's current interests. By comparing the user query to a list of keywords specified by an advertiser, it is possible to provide targeted advertisements to the user.

Another form of online advertising is advertisement syndication, which allows advertisers to extend their marketing reach by distributing advertisements to additional partners. For example, third party online publishers can place an advertiser's text or image advertisements on web pages that have content related to the advertisement. As the users are likely interested in the particular content on the publisher webpage, they are also likely to be interested in the product or service featured in the advertisement.

When an advertisement is selected within a web browser, a landing page associated with the advertisement is provided to the web browser. The landing page can, for example, be a web page of the advertiser. Often an advertiser may offer a product or service for purchase on the web page, or may elicit information, such as an e-mail address, from the user. The achievement of such a goal (e.g., a sale or obtaining contact information) is known as a conversion.

Some advertisers, however, do not offer products or services or elicit information on their web sites. Instead, the goal of these advertisers is to build brand recognition or provide the user with information about their products or services. An example is an automobile manufacturer. An automobile manufacturer does not sell automobiles on its web sites; however, it provides much information about its products on its web sites. Thus, the goal of this advertiser is to attract users that will spend a relatively long amount of time and/or navigate many pages on its web site. There is, however, no pricing model available for bidding for the placement of advertisements to such users.

SUMMARY

In general, one aspect of the subject matter described in this specification can be embodied in methods that include defining a traffic conversion for a web property, the traffic conversion defining a minimum traffic interaction of one or more associated user sessions with the web property; identifying traffic conversion bid data for the web property; receiving a request for a content item associated with the web property; determining conversion probability data, the conversion probability data defining a conversion probability that the traffic conversion will occur subsequent to a selection of the content item; and determining bid data for the content item request based on the traffic conversion bid data and the conversion probability data. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Overview

In general, the subject matter of this specification relates to determining the probability that a traffic conversion will occur for a given content item (e.g., an ad). A traffic conversion defines a conversion based on minimum traffic interactions of one or more associated user sessions with a content source (e.g., a web property). Traffic interactions occur when a user uses a client device (e.g., a computer or a television set top device) to visit or access a content source. A traffic interaction with a content source is an interaction that relates to length of the session with the content source and/or the number of pages navigated on the content source. A minimum traffic interaction thus defines a minimum duration of the user session or related user sessions with the content source, or a minimum quantity of pages associated with the content source navigated during the user session or related user sessions. Content property owners, e.g., advertisers, can select from different minimum traffic interactions to measure a traffic conversion. For example, a web property owner can select the minimum traffic interaction of a user session duration of three minutes as a traffic conversion, or a minimum traffic interaction of a selection of five web pages on the web property (e.g., website) during a user session, or during multiple associated user sessions during a period of interest (e.g., 30 days) as a traffic conversion. Although the implementations described herein are with reference to a web property being the content source, other content sources are also envisioned, for example, television content (e.g., media or interactive media provided through use of a television set top box device or an interactive radio receiver).

Traffic conversions can be defined by a traffic conversion system. The probability that the traffic interaction of one or more user sessions with a web property exceeds the minimum traffic interaction defined by the traffic conversion can be estimated based on the interactions of past users/user sessions with that web property. For example, the probability that a traffic conversion defining a minimum interaction of three minutes on website X will occur can be estimated by analyzing the traffic on website X of other users in past user sessions.

The traffic conversion probability for a given ad and session can be used to determine a corresponding click-based bid suitable for an ad selection auction. This permits an advertiser to set the amount they are willing to pay for a traffic conversion and still participate in an auction based on, for example, cost-per-click bids. The cost-per-click bid can be determined from the probability that the traffic conversion will occur and the amount of the advertiser's bid for the traffic conversion. This determined cost-per-click bid for the traffic conversion can also be used to adjust or set the ranking of the ad, for example, for ad selection purposes (e.g., whether an ad is to be displayed to a user) and/or ad placement purposes (e.g., an ad with a high traffic conversion probability will be more highly ranked than the same ad with a low traffic conversion probability and hence placed in a more prominent ad position).

§1.1 Advertising Environment

Figure 1A:
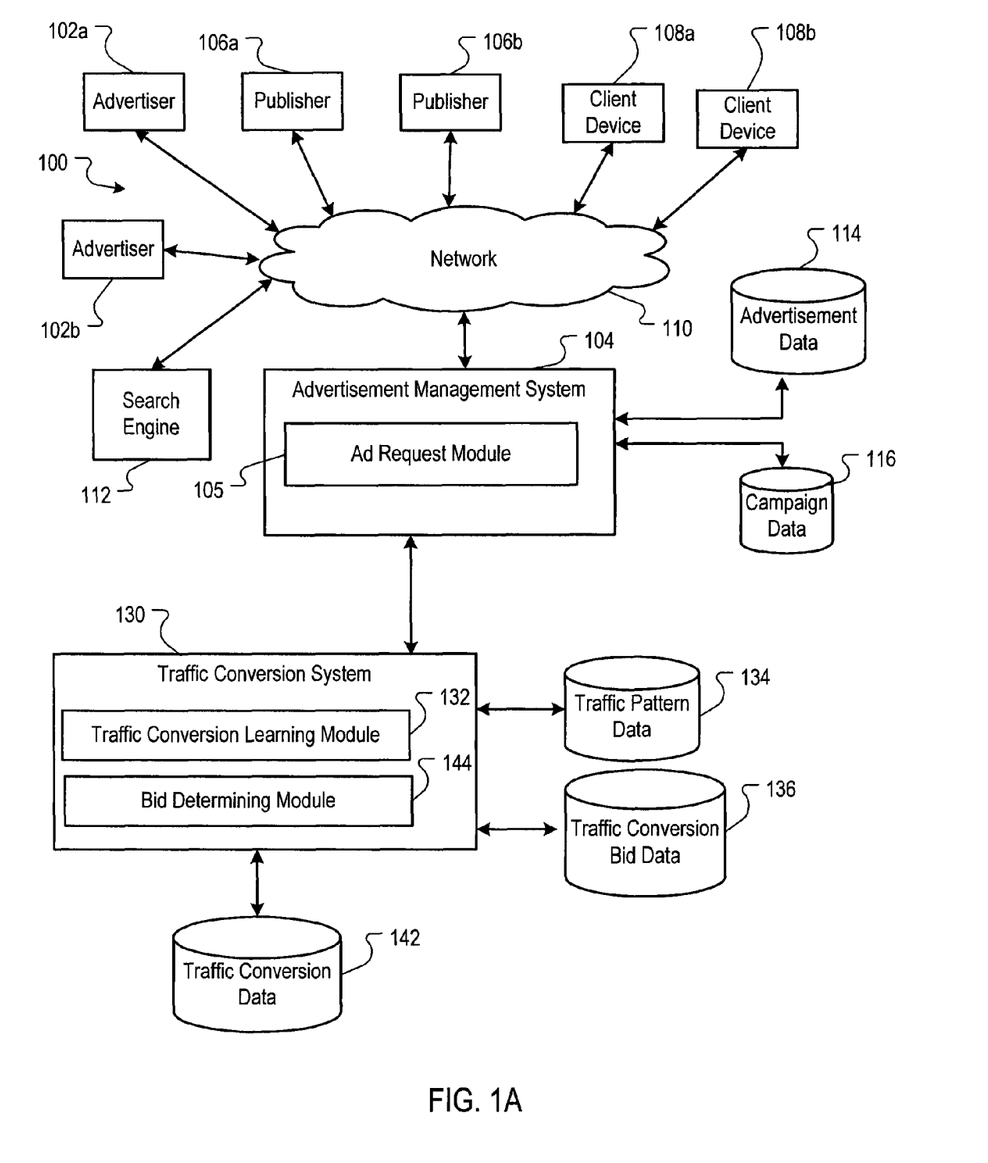
FIGS. 1A-1B are block diagrams of an example environment in which a traffic conversion system can be implemented.
Figure 1B:
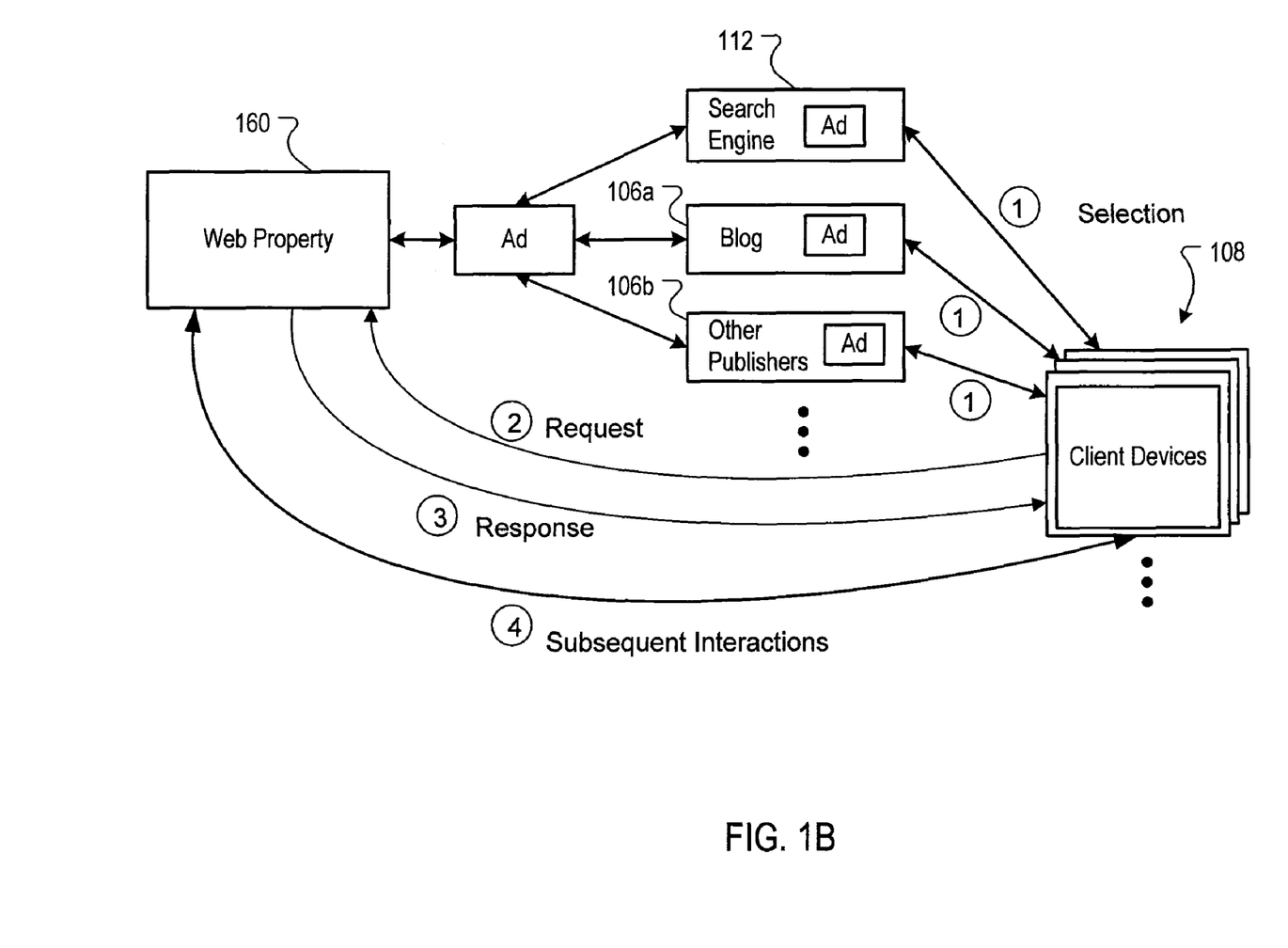

FIGS. 1A-1B are block diagrams of an example environment 100 in which a traffic conversion system 130 can be implemented. The online environment 100 can facilitate the identification and serving of content items, e.g., web pages, advertisements, etc., to users. A computer network 110, such as a local area network (LAN), wide area network (WAN), the Internet, or a combination thereof, connects advertisers 102*a* and 102*b*, an advertisement management system 104, publishers 106*a* and 106*b*, client devices 108*a* and 108*b*, and a search engine 112. Although only two advertisers (102*a* and 102*b*), two publishers (106*a* and 106*b*) and two client devices (108*a* and 108*b*) are shown, the online environment 100 may include many thousands of advertisers, publishers and client devices.

§1.2 Advertisement Publishing And Tracking

One or more advertisers 102*a* and/or 102*b* can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisement gadgets with or without interactive features, advertisements combining one of more of any of such components, etc., or any other type of electronic advertisement document. The advertisements may also include embedded information, such as a links, meta-information, and/or machine executable instructions, such as HTML or JavaScript™. The advertisement can be submitted, for example, as a single advertisement creative, in a group of related advertisements as an advertisement group, or in multiple advertisement groups that form an advertisement campaign.

A client device, such as client device 108*a*, can submit a page content request to a publisher 106 or the search engine 112. In some implementations, the page content can be provided to the client device 108*a* in response to the request. The page content can include advertisements provided by the advertisement management system 104, or can include executable instructions, e.g., JavaScript™, that can be executed at the client device 108*a* to request advertisements from the advertisement management system 104. Example client devices 108 include personal computers, mobile communication devices, television set-top boxes, game consoles, etc.

Advertisements can also be provided for the publishers 106. For example, one or more publishers 106*a* and/or 106*b* can submit advertisement requests for one or more advertisements to the system 104. In some implementations, the system 104 includes an ad request module 105 configured to receive/identify a request for an ad. The system 104 responds by sending the advertisements to the requesting publisher 106*a* or 106*b* for placement on one or more of the publisher's web properties (e.g., websites and other network-distributed content). Alternatively, the system 104 responds by sending the advertisement directly to the client device 108*a* in response to a client device request for page content from the one or more publishers 106*a* and/or 106*b*, typically via instructions embedded in the page content received by the client device 108*a* from the publishers 106*a* and/or 106*b*.

The advertisements can include embedded links to landing pages, i.e., pages on the advertisers 102 websites that a user is directed to when the user clicks an ad presented on a publisher 106 website. The advertisement requests can also include content request information. This information can include the content itself (e.g., page or other content document), a category corresponding to the content or the content request (e.g., arts, business, computers, arts-movies, arts-music, etc.), part or all of the content request, content age, content type (e.g., text, graphics, video, audio, mixed media, etc.), geo-location information, etc.

In some implementations, a publisher 106 can combine the requested content with one or more of the advertisements provided by the system 104. This combined page content and advertisements can be sent to the client device 108 that requested the content (e.g., client device 108*a*) as page content for presentation in a viewer (e.g., a browser or other content display system). The publisher 106 can transmit information about the advertisements back to the advertisement management system 104, including information describing how, when, and/or where the advertisements are to be rendered (e.g., in HTML or JavaScript™).

Publishers 106*a* and 106*b* can include general content servers that receive requests for content (e.g., articles, discussion threads, audio, video, graphics, search results, games, software, web page listings, information feeds, etc.), and retrieve the requested content in response to the request. For example, content servers related news content providers, retailers, independent blogs, social network sites, or any other entity that provides content over the network 110 can be a publisher.

Advertisements can also be provided through the use of the search engine 112. The search engine 112 can receive queries for search results. In response, the search engine 112 can retrieve relevant search results from an index of documents (e.g., from an index of web pages). The search engine 112 can also submit a request for advertisements to the system 104. The request for advertisements may also include the query (as entered or parsed), information based on the query (such as geo-location information, whether the query came from an affiliate and an identifier of such an affiliate), and/or information associated with, or based on, the search results.

The search engine 112 can combine the search results with one or more of the advertisements provided by the system 104. This combined information can then be forwarded to the client device 108 that requested the content as the page content. The search results can be maintained as distinct from the advertisements, so as not to confuse the user between paid advertisements and presumably neutral search results.

Advertisements and associated usage data (e.g., click-through-rate, impressions, etc.) can be stored as advertisement data in an advertisement data store 114. In some implementations, an advertiser 102 can further manage the serving of advertisement by specifying an advertising campaign. The advertising campaign can be stored in campaign data in a campaign data store 116 that can, for example, specify advertising budgets for advertisements, when, where and under what conditions particular advertisements may be served for presentation, etc.

§2.0 Determining Traffic Conversion Probabilities

In some implementations, a traffic conversion system 130 that estimates the probability that a traffic conversion for a given ad and user session (or multiple associated user sessions) will occur can be used in conjunction with the advertising management system 104. In the example implementation of FIG. 1A, the traffic conversion system 130 is a subsystem of the advertisement management system 104. In other implementations, the traffic conversion system 130 can be a separate system that can operate independently of the advertisement management system 104.

The traffic conversion system 130 can be realized by instructions that upon execution cause one or more processing devices to carry out the processes and functions described below. The traffic conversion system 130 can be distributively implemented over a network, such as a server farm, or can be implemented in a single computer device.

§2.1 Traffic Conversion Operation

There are many ways in which advertisers can pay or be charged for their advertisements. For example, advertisers can pay for their advertisements based on one or a combination of a cost-per-click basis, a cost-per-impression basis, and/or a cost-per-conversion basis. With respect to the latter basis, advertisers often define a conversion as resulting in a purchase transaction from the advertiser's website (e.g., web property) or a user submitting user information through the advertiser's website.

However, some advertisers may be more interested in conversions based on the level of interaction of a user on the advertiser's website (i.e., traffic conversion). For example, it is unlikely that a user will purchase a vehicle from a vehicle manufacturer's website. However, it may be valuable to the vehicle manufacturer to know that the user spent X minutes visiting a page for a specific vehicle. The vehicle manufacturer may consider spending more than X minutes on the website a conversion, even though no vehicle was purchased online.

In some implementations, the traffic conversion system 130 includes a traffic conversion learning module 132. The traffic conversion learning module 132 is configured to define a traffic conversion for a web property and generate a predictive model to estimate the probability of the traffic conversions occurring. A traffic conversion defines a minimum interaction of one or more associated user sessions with the web property.

A user session for a user can be identified in various ways. For example, a user account for a user (e.g., a user account for a search engine or other network system) can be used to identify user sessions for the user. Each user account can be keyed to a user identifier that is uniquely associated with a user, and the user identifier is also associated with user sessions for its account. Such an account-based user session is defined by the user logging into the user account and is maintained until the user logs out of the account. Upon granting permission to track the user's history (e.g., the user opts-in to allow the user's online activities to be tracked), historical data for the user's sessions and other user data are tracked and associated with the user identifier. At the user's option, only data approved by the user are tracked (e.g., if the account is for a search engine, only search queries and search result selections are tracked). The user can clear all historical data associated with the user account at any time, and can opt-out of such tracking at any time. Further, to protect the privacy of the user, the historical data can be anonymized so that the data cannot be associated with the user. Additionally, from the user account and the historical data, the user's associated user sessions with a particular web property can be determined.

A user session for a particular user can also be identified by an inference based on an identifier associated with the client device used by the user. For example, the IP address of the client device can be used to infer a user session for the user with a web property (e.g., the IP address of the client device can be included in a request for information from a web property).

A user session can further be identified by access to and use of a data file stored on a client device. For example, a persistent cookie stored on a client device can be used to identify the client device and access information about past online activities facilitated by the client device.

Associated user sessions are user sessions that are associated by the same identifying characteristic, such as the user identifier, the persistent cookie stored on a client device, or a particular network address. For example, a user may log into a network account using a user identifier and establish a first user session, during which the user selects an ad and is directed to a corresponding web property. During a later user session, established using the same user identifier for the network account, the user may later re-visit the web property. As the sessions are associated with the same user identifier, they are associated user sessions.

Exemplary traffic conversions can be the minimum interaction based on a duration of the one or more associated user sessions with the web property (e.g., at least X total minutes on the web property during user sessions with the web property during a two-week period of interest), a quantity of web pages associated with the web property navigated in the user session (e.g., visited at least Y pages of the web property during a user session), and time spent on a particular page of the web property. Traffic conversions can also be based on, for example, engagement to a particular page or group of pages of the web property (e.g., as determined by computer mouse movements on the page(s)), or based on a quantity of interactions with virtual pages such as AJAX pages/pages viewed but with no actual page transitions.

In some implementations, advertisers can select from a set of predetermined/predefined traffic conversions and/or can provide custom traffic conversions, and the traffic conversion learning module 132 can be trained for the predefined traffic conversions, and/or the custom advertiser traffic conversions defined by the advertisers. For example, a set of predefined traffic conversions may include minimum traffic interactions based on visiting a page for 1 minute, 2 minutes and 5 minutes during a single user session, or during associated user sessions during a period of interest. An advertiser interested in a traffic conversion not included in the set of predefined traffic conversions may provide a custom traffic conversion (e.g., visiting a page for 4 minutes). An advertiser may have multiple ads, and can select different and/or multiple traffic conversions for each ad. The predictive models are used to generate conversion probability data that define for each traffic conversion (e.g., predefined or custom) a probability that the traffic conversion will occur subsequent to an ad event for a user session, such as a selection of the ad (i.e., an ad click) or an impression of the ad for a particular user session.

The traffic conversion learning module 132 can be based on a variety of well known statistical and machine learning techniques (e.g., a logistic regression model).

The traffic pattern data for a given web property are used to generate the predictive models. Exemplary traffic pattern data include information about the durations of each of the past user sessions, the quantity of web pages associated with the web property navigated in each of the past user sessions, geo-location information about the client devices facilitating the past user sessions such as the country associated with the client device as identified by the IP address of the device, demographic information about the users (e.g., anonymized user demographic information), the time of day and/or day of the week during which the user sessions took place, the operating system of the client device facilitating the user session, where the ad resulting in the web property interaction was presented (e.g., a particular website, search engine, ad slot), the domain/uniform resource locator associated with the ad or web property, and other information relating to the context in which the user session occurred.

The traffic pattern data can also provide characterizations of a web property and ads associated with the web property. For example, the traffic pattern data can provide characterizations of the category of the web property (e.g., type of information, products or services presented by the web property), the language in which the information on the web property is presented (e.g., English, French, etc.), how well the ad associated with the web property matches the query (e.g., content of a web property), etc.

The predictive models can be based on such traffic pattern data and other historical data associated with one user session and/or multiple user sessions.

In some implementations, the user identification for traffic pattern data are anonymized for privacy protection. For example, a toolbar browser interface can generate a unique identifier that is not linked or otherwise explicitly associated with a user, and the traffic pattern of the user can be collected while protecting the user's privacy. In other implementations in which a user logs into a user account, identifying information related to the user's traffic can be anonymized, e.g., a user identifier can be hashed so that the traffic and ad selections are still associated by the hash value but are otherwise not associated with the user identifier. In still other implementations, the traffic pattern data can be completely anonymized, e.g., traffic pattern data for a session is associated with a random 128-bit number.

Once trained, the traffic conversion learning module 132 can generate a traffic conversion probably for an ad request for a user session or multiple associated user sessions. The user session features, such as geo-location information, user demographics, and any other user session features that are used to train the predictive model, can be used to predict the probability of a traffic conversion occurring for one or more associated user sessions with a particular web property for a given ad. For example, the traffic conversion learning module 132 can generate a traffic conversion probability for an ad for a traffic conversion defining a minimum traffic interaction of a user visiting a web property for at least five minutes during a single user session, or visiting a web property for at least fives minutes a day for three of the next ten days, or visiting ten pages of the web property during a thirty day period.

The traffic pattern data can be collected from or provided by, for example, advertisers 102, publishers 106, and search engines 112. For example, a vehicle manufacturer can provide traffic pattern data to the traffic conversion system 130 including for each user session from a reporting period, information about which vehicle pages were viewed, how long each vehicle page was viewed, what time the session started and ended, if the session involved special website features such as building a vehicle to user preferences or the "locate a dealer near you" feature, etc. In some implementations, the traffic pattern data can be stored in and accessed from the traffic pattern data store 134.

The collection of traffic pattern data and the relation between web properties, client devices 108, publishers 106, and the search engine 112 is explained with reference to FIG. 1B. A client device 108 requests page content from a search engine 112, blog 106a, or other publishers 106b (selection 1). For example, a user can use a client device 108 to visit a search engine 112 and search for vehicles. In response to the user query, the search engine 112 requests one or more ads from the advertisement management system 104 (e.g., from the ad request module 105) for ads related to the query. Based on keywords used in the search, the system provides ads relevant to the search keywords (e.g., an ad associated with web property 160). After receiving the ads the search engine provides a list of search results and the ads to be displayed on the client device 108.

The user can then select, for example, the ad associated with the web property 160 which causes the client device 108 to send a content request (request 2) to the web property 160, e.g., a vehicle manufacture's website. In turn, the web property 160 provides a response to the request, the response including the requested website content, e.g., a specific vehicle information page or a landing page from the manufacturer's website (response 3). The user, through use of the client device 108, can then continue interactions with the web property 160, e.g., request and receive additional website content or simply browse the previously provided webpage (subsequent interactions 4).

After a number of interactions during numerous different user sessions for other client devices 108, traffic pattern data for the web property 160 can be used by the traffic conversion learning module 132 to generate a predictive model for one or more traffic conversions associated with the web property 160. As the traffic pattern data for the web property 160 can change over time, the traffic conversion learning module 132 can generate (or update) the predictive model at predetermined intervals (e.g., every two weeks) based on the most recent traffic pattern data. The traffic conversion learning module 132 can, for example, store the predictive model(s) and/or the conversion probability data in the traffic conversion data store 142.

The bid determining module 144 can receive traffic conversion bid data for web properties provided by the advertisers. The traffic conversion bid data defines bid amounts for the traffic conversions from the advertisers/web property owners. For example, a web property owner may be willing to bid $7.00 for a traffic conversion defining a minimum traffic interaction of five pages navigated on the owner's web property during a user session, or $6.00 for a traffic conversion defining a minimum traffic interaction level of ten minutes spent visiting the web property during a user session. The bid determining module 144 can access and store traffic conversion bid data in the traffic conversion bid data store 136 according to web property, web property owner, and/or type of traffic conversion associated with the traffic conversion bid. In some implementations, the bid determining module 144 can receive the traffic conversion bid data from the advertisement management system 104 or directly from the advertisers 102 (e.g., through a browser interface).

Once the traffic conversion learning module 132 is trained, the traffic conversion learning module 132 provides a conversion probability to the bid determining module 144 for an ad request for an ad that has an associated traffic conversion bid. The bid determining module 144 can determine bid data for an ad request (e.g., for an ad associated with a web property) based on the traffic conversion bid data and the conversion probability data for the requested ad and user session. The bid data are derived from and representative of the traffic conversion bids and corresponding conversion probabilities and are suitable, for example, for use in a click-based, auction-style ad selection process (e.g., CPC-based auctions). One example auction is a second-price auction that receives cost-per click bids and multiplies the bid by a quality score associated with the ad. A quality score can be the basis for measuring the quality and relevance of an ad. The quality score can, for example, be based on the ad's click-through rate, the relevance of the ad text, overall historical keyword performance, and the landing page associated with the ad.

For example, a traffic conversion bid of $7.00 by a web property owner/advertiser for a particular minimum traffic interaction cannot be directly processed in a typical click-based ad auction, which is based on a bid that an ad will be selected (i.e., "clicked") and not that a conversion will occur. To effectively participate in click-based auctions the bid determining module 144 converts the traffic conversion bid into a click-based bid that takes into account the amount of the traffic conversion bid and the likelihood that the traffic conversion will occur. In some implementations, the bid determining module 144 can determine the bid data in part by multiplying the conversion probability data for a given ad by the corresponding traffic conversion bid data. For example, the conversion probability data may include a conversion probability for a traffic conversion of an ad of 7% and the web property owner associated with that ad may have bid $6.00 for a traffic conversion defining a minimum traffic interaction level of five pages navigated on the owner's web property as a result of the selection of the ad. Thus the bid data for the ad would include the bid amount of $0.42 ($6.00*0.07).

For example, suppose the quality score of ads A, B, and C are "2," "1," and "1," respectively. Assume a traffic conversion bid for ad A has been converted into a click-based bid by the bid determining module 144. The rank of ads A, B, and C can be based on the following:

A: Rank=quality score×converted traffic conversion bid=2.0×$0.42=0.84

B: Rank=quality score×cost-per-click bid=1.0×$0.40=0.40

C: Rank=quality score×cost-per-click bid=1.0×$0.45=0.45

The ads can be ranked as follows:
1. A
2. C
3. B

The advertisement management system 104 can determine ad rank data based on the auction results for the ads. For example, the ad rank data for ads A, B, and C would indicate that ad A should be placed in the most prominent ad slot position, C the next most prominent ad slot position and B the least prominent ad slot position.

§2.2 Monetization of Ads

Charging advertisers (e.g., web property owners) utilizing a traffic conversion advertising payment scheme can be implemented in a variety of ways. In some implementations, the advertisement management system 104 provides an ad (associated with a traffic conversion) to be displayed to a client device 108, and determines whether the ad was selected at the client device 108 and whether the traffic conversion occurred in the corresponding user session (e.g., from data provided by the advertiser 102, the publishers 106, or the search engine 112). In some implementations, assuming the ad was selected and the traffic conversion occurred, an account (e.g., an advertising account described in the advertisement data store 114) associated with the advertiser/web property is debited for an amount defined by the traffic conversion bid data. For example, if an advertiser/web property owner has a bid of $8.00 for a traffic conversion defining a minimum traffic interaction of more than ten minutes on the web property and the user session lasted twelve minutes then the advertisement management system 104 can debit the advertiser/web property owner's account for $8.00.

Conversely, if the ad was selected but the traffic conversion failed to occur then the advertisement management system 104 can log but not debit the advertiser/web property owner's account for the amount defined by the traffic conversion bid data. Thus the advertiser/web property owner is only charged if the traffic conversion occurs.

In some implementations, the advertisement management system 104 provides an ad to be displayed to a client device 108 and determines whether the ad was selected at the client device 108 (but not necessarily whether a traffic conversion occurred). In such an implementation, if the ad was selected, regardless of whether a traffic conversion occurred, then an account associated with the advertiser/web property owner is debited for an amount defined by the bid data. For example, if the ad was selected and an advertiser/web property owner had a bid of $8.00 for a traffic conversion defining a minimum traffic interaction of more than ten minutes and the conversion probability that the traffic conversion for the ad will occur is 7% then the advertisement management system 104 can debit the advertiser/web property owner's account for an amount defined by the bid data of a bid of $0.56 ($8.00*0.07). Likewise, if the ad was not selected, then the advertiser/web property owner would not be charged.

However, other charging schemes are possible such as charging the advertiser/web property owner an amount proportional to the actual interaction of the user session with the minimum traffic interaction defined by the traffic conversion. For example, if the minimum traffic interaction defined by the traffic conversion is five minutes on the web property and the user session only lasts three minutes then charging the advertiser/web property 3/5 of the traffic conversion bid amount.

§3.0 Example Process Flows

Figure 2:
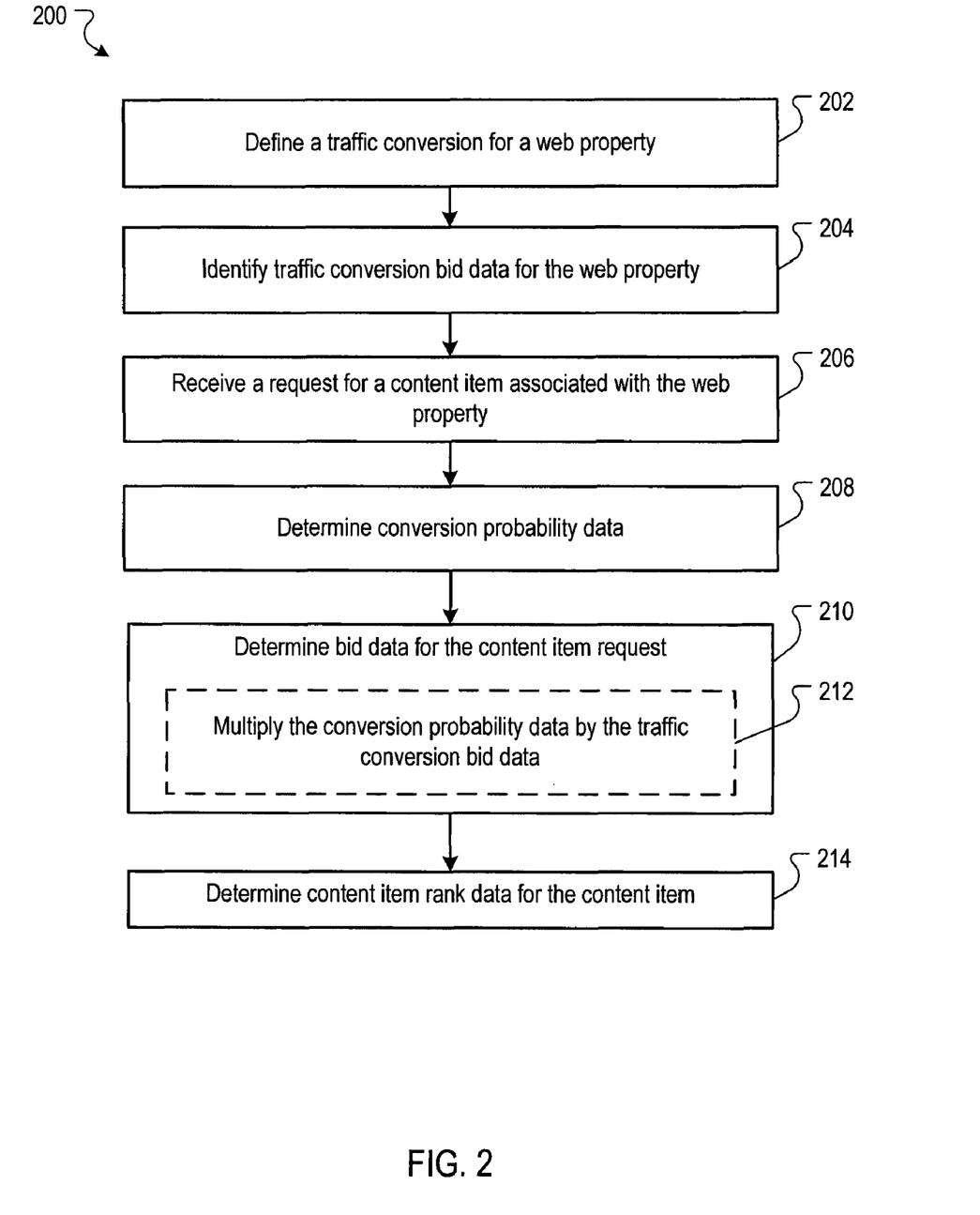
FIG. 2 is a flow diagram of an example process for determining conversion probability data for a content item.

FIG. 2 is a flow diagram of an example process 200 for determining conversion probability data for a content item. The process 200 can, for example, be implemented in the traffic conversion system 130 and/or the advertisement management system 104.

A traffic conversion for a web property is defined (202). The traffic conversion defines a minimum traffic interaction of one or more associated user sessions with the web property. For example, the traffic conversion learning module 132 can be used to predefine a traffic conversion.

Traffic conversion bid data for the web property are identified (204). For example, the bid determining module 144 can be used to identify traffic conversion bid data provided by the advertisers. In some implementations, the traffic conversion bids are accessed by the bid determining module 144 from the advertisement management system 104 and stored in the traffic conversion bid data store 136.

A request for a content item associated with the web property is received (206). For example, the ad request module 105 can receive a request for ads (e.g., request for content items). The ad request may originate from, for example, the search engine 112 or the publishers 106 and may include a keyword from which ads relevant to the keyword are selected. For example, the web property may have an ad highly associated with the keyword causing the advertisement management system 104 to select the web property's ad for possible display (as determined by other factors such as those considered in the auction process). The content item request includes session feature data that identify one or more user session features on which the traffic conversion learning module 132 is trained.

Conversion probability data are determined (208). The conversion probability data define a conversion probability that the traffic conversion of a content item (e.g., an ad) will occur subsequent to a selection of the content item or an impression of the content item. For example, the traffic conversion learning module 132 can determine the likelihood of a traffic conversion occurring based on the content item request and session features, and store the conversion probability data in the traffic conversion data store 142.

Bid data for the content item request are determined based on the traffic conversion bid data and the conversion probability data (210). For example, the bid data can be determined by the bid determining module 144. The bid data is a derivation of the traffic conversion bid data and the conversion probability data that can be used in a click-based ad selection auction.

In some implementations, determining bid data includes multiplying the conversion probability data for a given content item by the traffic conversion bid data (212). For example, the bid determining module 144 can be used to multiply the conversion probability data for a given content item by the traffic conversion bid data. The multiplication can be scaled by a scalar, in some implementations.

Content item rank data for the content item are determined based on the traffic conversion bid data and the conversion probability data (214). For example, the traffic conversion bid data and the conversion probability data can be used to generate a cost-per click bid that is a converted traffic conversion bid. The converted traffic conversion bid can be used in an auction and the content item rank data defines the auction result, i.e., the rank of the content item (e.g., ad) resulting from the auction.

Figure 3:
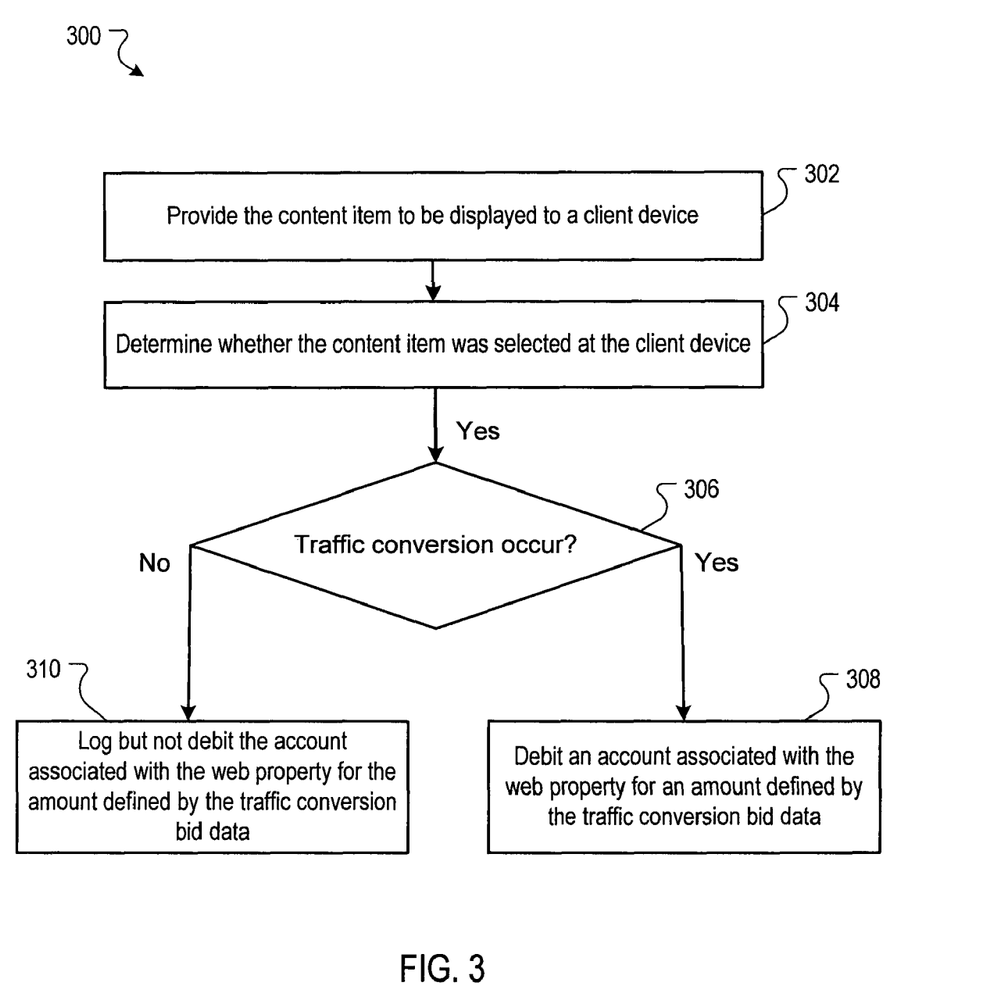
FIG. 3 is a flow diagram of an example process for monetizing a traffic conversion.

FIG. 3 is a flow diagram of an example process 300 for monetizing a traffic conversion. The process 300 can, for example, be implemented in the traffic conversion system 130 and/or the advertisement management system 104.

A content item to be displayed to a client device is provided (302). For example, the advertisement management system 104 can provide an ad (e.g., content item) to the search engine 112 and/or the publishers 106 which, in turn, can be displayed to the client device 108.

Whether the content item was selected at the client device is determined (304). For example, advertisement management system 104 can determine whether the ad associated with the web property was selected at the client device 108 (e.g., from data provided by the advertiser 102, the publishers 106, or search engine 112).

Whether the traffic conversion occurred in the user session is determined (306). For example, advertisement management system 104 can determine whether a traffic conversion of the ad occurred in the user session (e.g., from data provided by the advertiser 102).

If the traffic conversion occurred, then an account associated with the web property is debited for an amount defined by the traffic conversion bid data (308). For example, the advertisement management system 104 can debit an account associated with the web property for the amount defined by the traffic conversion bid data if the traffic conversion occurred.

If the traffic conversion failed to occur, then the account associated with the web property is not debited but is logged for the amount defined by the traffic conversion bid data (310). For example, the advertisement management system 104 can log but not debit the account associated with the web property for an amount defined by the traffic conversion bid data if the traffic conversion failed to occur.

Figure 4:
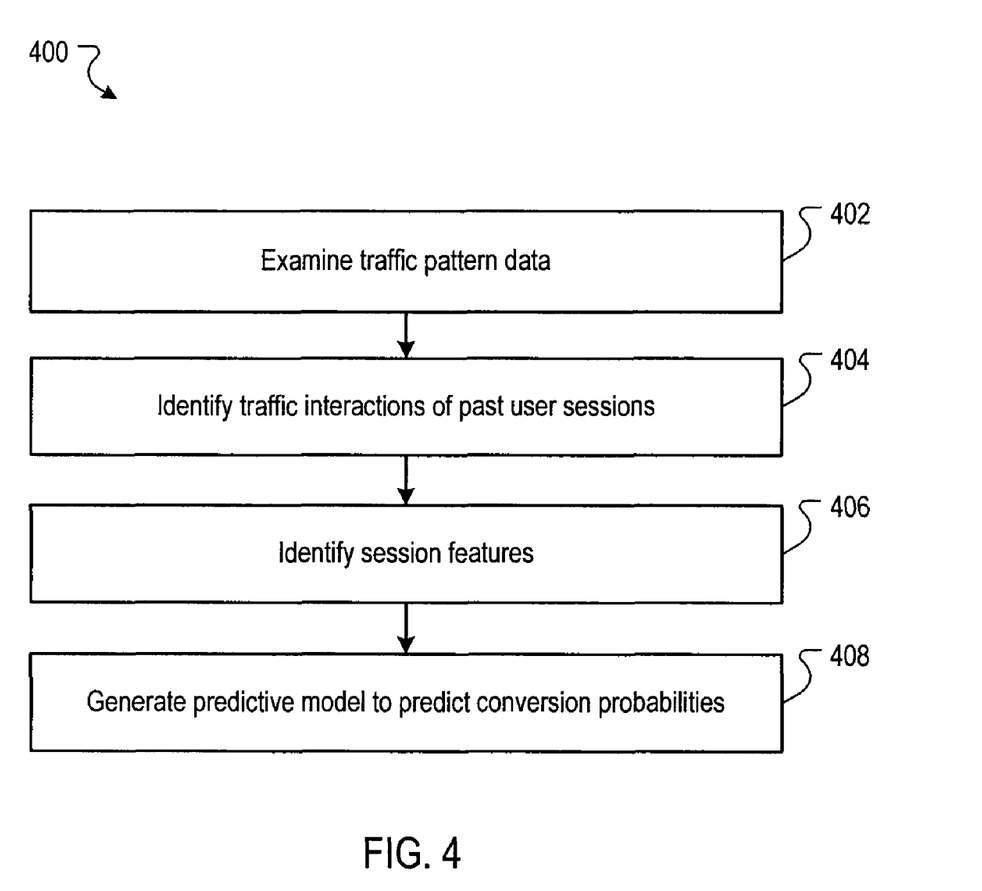
FIG. 4 is a flow diagram of an example process for generating a traffic conversion probability prediction model.

FIG. 4 is a flow diagram of an example process 400 for generating a traffic conversion probability prediction model. The process 400 can, for example, be implemented in the traffic conversion system 130 to train the traffic conversion learning module 132. The process 400 can be based on a variety of well known statistical and machine learning techniques (e.g., a logistic regression model).

Traffic pattern data are examined (402). For example, the traffic conversion learning module 132 can examine traffic pattern data (e.g., as provided by an advertiser/web property owner or from client device 108 activity logs) for a web property associated with a content item request (e.g. ad request).

Interaction of past user sessions with the web property are identified (404). For example, the traffic conversion learning module 132 can identify past user sessions on the web property from traffic pattern data provided by an advertiser/web property owner or from client device 108 activity logs. For example, the traffic pattern data are partitioned according to past user sessions. In some implementations, the traffic pattern data can be partitioned by, for example, the advertiser/web property owner to identify the past user sessions and then provided to the traffic conversion learning module 132.

Session features from the past user sessions are identified (406). For example, the traffic conversion learning module 132 can identify session features from the past user sessions. These session features can be grouped according to the associations of past user sessions. Exemplary session features can include information about or characterizations of the web property such as the category of the web property (e.g., type of information, products or services presented by the web property) or the language in which the information on the web property is presented (e.g., English, French, etc.), durations of each of the past user sessions, the quantity of web pages associated with the web property navigated in each of the past user sessions, geo-location information about the client devices facilitating the past user sessions such as the country associated with the client device as identified by the IP address of the device, demographic information about the users (e.g., anonymized user demographic information), the time of day and/or day of the week during which the user sessions took place, the operating system of the client device facilitating the user session, where the ad resulting in the web property interaction was presented (e.g., a particular website, search engine, ad slot), how well the ad associated with the web property matches the query (e.g., content of a web page), the domain/uniform resource locator associated with the ad or web property. In some implementations, the advertiser/web property owner provides the identified session features to the traffic conversion learning module 132.

A predictive model to predict conversion probabilities is generated (408). For example, the traffic conversion learning module 132 can be trained to generate a predictive model to predict conversion probabilities (e.g., conversion probability data) based on the session features for the past user sessions. For example, the traffic conversion learning module 132 can determine the conversion probability data based on a mathematical function derived from logistic regression of the session features for a plurality of predefined traffic conversions. However, other predictive models (e.g., statistical processes and machine learning algorithms) can also be used.

§4.0 Example Processing System

Figure 5:
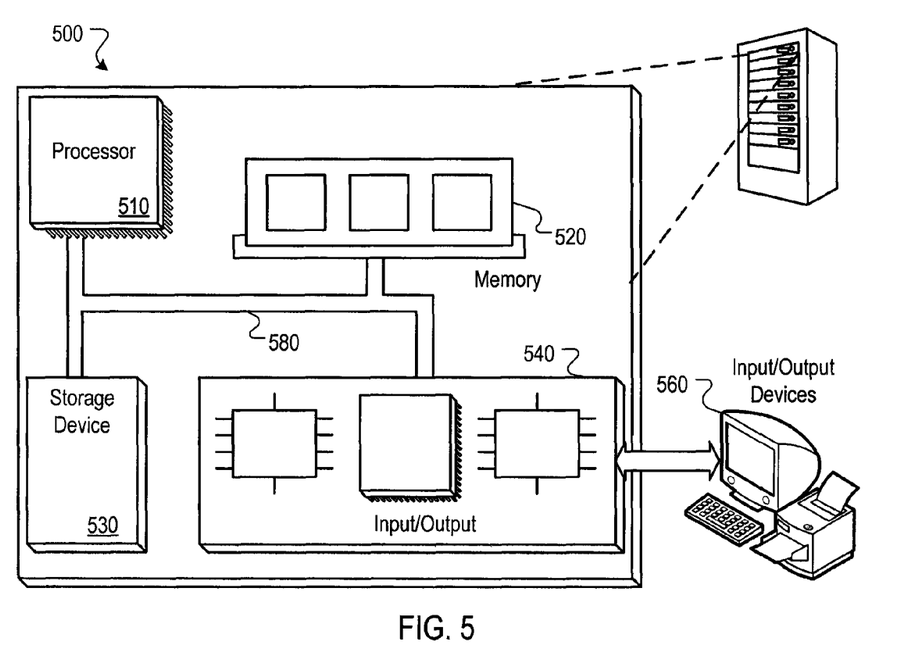
FIG. 5 is a block diagram of an example computer processing system that can be used to implement the traffic conversion system.

FIG. 5 is block diagram of an example computer processing system 500 that can be used to determine conversion probabilities, bid data, and/or content item rank data. The system 500 can be used to realize a variety of different types of computer devices, such as the client devices 108 or server and computer devices on which the advertising system 104 and the traffic conversion system 130 are implemented.

The system 500 includes a processor 510, a memory 520, a storage device 530, and an input/output device 540. Each of the components 510, 520, 530, and 540 can, for example, be interconnected using a system bus 580. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can, for example, include a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, etc.

Although an example processing system has been described in FIG. 5, embodiments of the subject matter and the functional operations described in this specification can be implemented in other digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying Figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
    defining a traffic conversion for a web property, wherein the traffic conversion defines a minimum traffic interaction of multiple associated user sessions for a user identifier with the web property during a specified time period, wherein the minimum traffic interaction defines at least one of (i) a minimum duration of an aggregation of durations of each of the multiple user sessions on the web property and (ii) a quantity of an aggregation of web pages of the web property navigated in the multiple user sessions;
    identifying traffic conversion bid data for the web property specifying a traffic conversion bid amount that a sponsor of the web property is willing to pay for traffic interactions associated with the user identifier and the web property that meet or exceed the minimum traffic interaction;
    receiving a request for a content item associated with the web property;
    determining by one or more processing devices conversion probability data, the conversion probability data defining a conversion probability that the traffic conversion will occur subsequent to a selection of the content item; and
    determining by the one or more processing devices bid data for the content item request based on the traffic conversion bid data and the conversion probability data, wherein determining the bid data comprises:
        determining a product of the traffic conversion bid amount specified by the traffic conversion bid data and the conversion probability specified by the conversion probability data; and
        converting the traffic conversion bid amount for the web property to a click-based bid amount for the content item for use in a click-based content item selection process based at least in part on the product of the traffic conversion bid amount and the conversion probability.

2. The method of claim 1, further comprising:
    providing the content item to be displayed to a client device;
    determining whether the content item was selected at the client device; and
    determining whether the traffic conversion occurred in the multiple user sessions.

3. The method of claim 2, further comprising:
    if the content item was selected and the traffic conversion occurred, then debiting an account associated with the web property for an amount defined by the traffic conversion bid data.

4. The method of claim 3, further comprising:
    if the content item was selected and the traffic conversion failed to occur, then logging but not debiting the account associated with the web property for the amount defined by the traffic conversion bid data.

5. The method of claim 2, further comprising:
    in response to determining that the content item was selected and the traffic conversion failed to occur, determining a ratio of a traffic interaction of the multiple associated user sessions with the web property subsequent to the selection of the content item to the minimum traffic interaction; and
    debiting an account associated with the web property for an amount proportionate to the ratio.

6. The method of claim 1, further comprising:
    providing the content item to be displayed to a client device;
    determining whether the content item was selected at the client device; and
    if the content item was selected, then debiting an account associated with the web property for an amount defined by the bid data.

7. The method of claim 1 wherein determining conversion probability data comprises:
    analyzing traffic pattern data for the web property to identify traffic interaction levels of a plurality of past user sessions with the web property, the traffic pattern data defining traffic patterns for the plurality of past user sessions on the web property; and
    defining durations of each of the plurality of past user sessions on the web property and a quantity of web pages associated with the web property navigated in each of the plurality of past user sessions.

8. The method of claim 7 wherein determining conversion probability data comprises:
    determining a first probability that any given user's traffic interaction of multiple user sessions with the web property exceeds the minimum traffic interaction defined by the traffic conversion based at least in part on the analyzed traffic pattern data; and
    generating the conversion probability data based on the first probability.

9. The method of claim 7 wherein determining conversion probability data comprises:

utilizing a logistic regression model to determine the conversion probability data for a given content item based on the analyzed traffic pattern data.

10. The method of claim 1 wherein the content item is an advertisement.

11. A system, comprising:
one or more data processors; and
instructions stored on a computer readable storage medium that when executed by the one or more data processors cause the one or more data processors to implement:
a content item request module configured to identify a request for a content item associated with a web property;
a traffic conversion learning module configured to:
identify a traffic conversion for the web property, wherein the traffic conversion defines a minimum traffic interaction of multiple associated user sessions for a user identifier with the web property during a specified time period, wherein the minimum traffic interaction defines at least one of (i) a minimum duration of an aggregation of durations of each of the multiple user sessions on the web property and (ii) a quantity of an aggregation of web pages of the web property navigated in the multiple user sessions; and
determine conversion probability data, the conversion probability data defining a conversion probability that the traffic conversion will occur subsequent to a selection of the content item; and
a bid determining module configured to:
identify traffic conversion bid data for the web property specifying a traffic conversion bid amount that a sponsor of the web property is willing to pay for traffic interactions associated with the user identifier and the web property that meet or exceed the minimum traffic interaction; and
determine bid data for the content item request based on the traffic conversion bid data and the conversion probability data, wherein determining the bid data comprises:
determining a product of the traffic conversion bid amount specified by the traffic conversion bid data and the conversion probability specified by the conversion probability data; and
converting the traffic conversion bid amount for the web property to a click-based bid amount for the content item for use in a click-based content item selection process based at least in part on the product of the traffic conversion bid amount and the conversion probability.

12. The system of claim 11 wherein the traffic conversion learning module is configured to:
analyze traffic pattern data for the web property to identify traffic interaction levels of a plurality of past user sessions on the web property, the traffic pattern data defining traffic patterns for the plurality of past user sessions on the web property;
define durations of each of the plurality of past user sessions on the web property; and
define a quantity of web pages associated with the web property navigated in each of the plurality of past user sessions.

13. The system of claim 12 wherein to determine the conversion probability data, the traffic conversion learning module is configured to:
determine a first probability that any given user's traffic interaction of multiple user sessions with the web property exceeds the minimum traffic interaction defined by the traffic conversion based at least in part on the analyzed traffic pattern data; and
generate the conversion probability data based on the first probability.

14. Software stored on a non-transitory computer readable storage medium and comprising instructions executable by a processing device and upon such execution cause the processing device to perform operations comprising:
define a traffic conversion for a content source, wherein the traffic conversion defines a minimum traffic interaction of multiple associated user sessions for a user identifier with the content source during a specified time period, wherein the minimum traffic interaction defines at least one of (i) a minimum duration of an aggregation of durations of each of the multiple user sessions on the content source and (ii) a quantity of an aggregation of web pages of the content source navigated in the multiple user sessions;
identify traffic conversion bid data for the content source specifying a traffic conversion bid amount that a sponsor of the content source is willing to pay for traffic interactions associated with the user identifier and the content source that meet or exceed the minimum traffic interaction;
receive a request for a content item associated with the content source;
determine conversion probability data, the conversion probability data defining a conversion probability that the traffic conversion will occur subsequent to a selection of the content item; and
determine bid data for the content item request based on the traffic conversion bid data and the conversion probability data, wherein determining the bid data comprises:
determining a product of the traffic conversion bid amount specified by the traffic conversion bid data and the conversion probability specified by the conversion probability data; and
converting the traffic conversion bid amount for the web property to a click-based bid amount for the content item for use in a click-based content item selection process based at least in part on the product of the traffic conversion bid amount and the conversion probability.

15. The software of claim 14 wherein the content item is an advertisement.

* * * * *